(12) United States Patent
Park et al.

(10) Patent No.: US 8,798,177 B2
(45) Date of Patent: Aug. 5, 2014

(54) INTER-CARRIER BANDWIDTH CONTROL FOR MITIGATING IQ IMBALANCE

(75) Inventors: Chester Park, Seoul (KR); Lars Sundström, Södra Sandby (SE); Jim Svensson, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 357 days.

(21) Appl. No.: 13/098,954

(22) Filed: May 2, 2011

(65) Prior Publication Data

US 2011/0268232 A1    Nov. 3, 2011

Related U.S. Application Data

(63) Continuation-in-part of application No. 13/045,386, filed on Mar. 10, 2011, now Pat. No. 8,565,352.

(60) Provisional application No. 61/330,612, filed on May 3, 2010.

(51) Int. Cl.
*H04K 1/10* (2006.01)
*H04L 27/28* (2006.01)

(52) U.S. Cl.
USPC ........... 375/260; 375/261; 375/275; 375/344; 333/176

(58) Field of Classification Search
CPC ...... H04L 27/3863; H03D 3/009; H03D 7/18; H03D 7/166; H03D 2200/0088; H03D 3/008
USPC ................... 375/260, 261, 275, 344; 333/176
See application file for complete search history.

(56) References Cited

U.S. PATENT DOCUMENTS

| 6,266,321 | B1 | 7/2001 | Pehkonen et al. | |
| 6,510,317 | B1 | 1/2003 | Marko et al. | |
| 6,844,787 | B2 * | 1/2005 | Vann et al. | 332/103 |
| 2002/0057752 | A1 * | 5/2002 | Denno | 375/346 |
| 2005/0276354 | A1 | 12/2005 | Su et al. | |
| 2008/0225182 | A1 * | 9/2008 | Silver et al. | 348/726 |

(Continued)

FOREIGN PATENT DOCUMENTS

| WO | WO 00/70773 | 11/2000 |
| WO | WO 2009/088528 A2 | 7/2009 |

OTHER PUBLICATIONS

Yuan G. et al., "Carrier aggregation for LTE-Advanced mobile communication systems," IEEE Commun. Mag., vol. 48, No. 2, pp. 88-93, Feb. 2010.

(Continued)

*Primary Examiner* — Shuwang Liu
*Assistant Examiner* — Sung Ahn

(57) ABSTRACT

Digital IQ imbalance estimation and compensation is facilitated by shaping the frequency response of receiver branches. In particular, in a multi-carrier receiver, the frequency response of signal processing elements in at least one receiver branch is set to not fully attenuate received signals in a frequency band of interest. The frequency band of interest is greater than the carrier bandwidth of the received signal processed by that receiver branch. In some embodiments, the received signal is not attenuated, and adjacent interfering signals are partially attenuated. This allows information regarding the interfering signals to appear in an IQ imbalance-induced, inter-carrier image of the signals in anther receiver branch, facilitating digital estimation and compensation of IQ imbalance.

35 Claims, 10 Drawing Sheets

(56) References Cited

U.S. PATENT DOCUMENTS

| | | | |
|---|---|---|---|
| 2009/0196334 A1* | 8/2009 | Bai et al. | 375/226 |
| 2010/0040178 A1 | 2/2010 | Sutton et al. | |
| 2010/0054367 A1 | 3/2010 | Gorday | |
| 2010/0297975 A1* | 11/2010 | Carrera et al. | 455/307 |
| 2011/0207418 A1 | 8/2011 | Laroia et al. | |
| 2012/0320833 A1* | 12/2012 | Yamamoto et al. | 370/328 |

OTHER PUBLICATIONS

Springer A. et al., "RF system concepts for highly integrated RFICs for W-CDMA mobile radio terminals," in *IEEE Trans. Microw. Theory and Tech.*, vol. 50, No. 1, pp. 254-267, Jan. 2002.

The Decision on grant and Translation of the Decision on grant dated Jan. 10, 2014 from the Russian patent application No. 2012151503, the whole document.

Johansson, K. et al. "Multi-carrier HSPA evolution." in *Proc. IEEE Vehicular Technology Conference (VTC)*, Barcelona, Spain, Jun. 2009, the whole document.

Rudell, J.C. et al. "A 1.9-GHz wide-band IF double conversion CMOS receiver for cordless telephone applications," in *IEEE J. of Solid-State Circuits*, vol. 32, No. 12. pp. 2071-2088, Dec. 1997.

Cho, S. et al. "Effect of phase mismatch on image rejection in Weaver architecture." in *IEEE Trans. Microw. Wireless Comp. Letters*. vol. 17, No. 1, pp. 70-72, Jan. 2007.

Der, L. et al. "A 2-GHz CMOS image-reject receiver with LMS calibration," in *IEEE J. of Solid-State Circuits*. vol. 38, No. 2, Feb. 2003m the whole document.

Valkama, M. et al. "A novel image rejection architecture for quadrature radio receivers," in *IEEE Trans. Circuits Syst. II—Express Briefs*. vol. 51, No. 2. pp. 61-68, Feb. 2004.

Tarighat, A. et al. "Compensation schemes and performance analysis of IQ imbalances in OFDM receivers." in *IEEE Trans. Signal Processing*, vol. 53. No. 8, pp. 3257-3268, Aug. 2005.

Kiss, P. et al. "One-tap wideband I/Q compensation for zero-IF filters." in *IEEE Trans. Circuits Syst. I—Reg. Papers*, vol. 51. No. 6, pp. 1062-1074, Jun. 2004.

3rd Generation Partnership Project (3GPP): Technical Specification Group Radio Access Network; Evolved Universal Terrestrial Radio Access (E-UTRA): physical channels and modulation, http://www.3gpp.org/ftp/Specs/html-info/36211.htm, the whole document, V9.0.0 (Dec. 2009).

Chrabieh et al: "IQ Imbalance Mitigation via Unbiased Training Sequences", Global Telecommunications Conference, 2007. Globecom '07. IEEE, IEEE, Piscataway, NJ, USA, Nov. 1, 2007.

\* cited by examiner

INTER-CARRIER BANDWIDTH CONTROL FOR MITIGATING IQ IMBALANCE

CROSS-REFERENCE TO RELATED APPLICATIONS

This application is a continuation-in-part of U.S. application Ser. No. 13/045,386, filed Mar. 10, 2011, now U.S. Pat. No. 8,565,352 B2, and claims priority to U.S. Provisional Patent Application No. 61/330,612, filed May 3, 2010, the disclosures of both of which are incorporated herein by reference in their entireties.

FIELD OF THE INVENTION

The present invention relates generally to wireless communications, and in particular to a method of mitigating IQ imbalance in multi-carrier receivers in carrier aggregation systems.

BACKGROUND

In order to achieve higher peak data rates in future wireless networks, simultaneous transmission and reception of multiple carriers, referred to as carrier aggregation, is considered as a key element. The Third Generation Partnership Project (3GPP) has been standardizing the carrier aggregation for Long Term Evolution (LTE), as described in a paper by G. Yuan, X. Zhang, Wang and Y. Yang, titled "Carrier aggregation for LTE-Advanced mobile communication systems," published in *IEEE Commun. Mag.*, vol. 48, no. 2, pp. 88-93, February 2010, the disclosure of which is incorporated herein by reference in its entirety. From the perspective of mobile terminals, carrier aggregation poses unprecedented design challenges, especially when multiple, non-contiguous carriers need to be transmitted and received simultaneously.

Regarding the receiver architectures of mobile terminals, a direct conversion receiver is well suited for carrier aggregation. Although direct conversion receiver has gained much popularity recently, as indicated in the book, *RF Microelectronics*, by B. Razavi, Upper Saddle River, N.J., Prentice-Hall, 1998, the disclosure of which is incorporated herein by reference in its entirety, each carrier inevitably requires an individual receiver, thereby leading to inefficient implementation. On the other hand, a wideband IF double conversion receiver is known, as described in the paper by A. Springer, L. Maurer and R. Weigel, titled "RF system concepts for highly integrated RFICs for W-CDMA mobile radio terminals," published in *IEEE Trans. Microw. Theory and Tech.*, vol. 50, no. 1, pp. 254-267, January 2002, the disclosure of which is incorporated herein by reference in its entirety. The wideband IF double conversion receiver reuses both the RF mixing stage and IF mixing stage (i.e., local oscillators, or LOs, and mixers), allowing for cost-efficient and power-efficient implementation. Moreover, it retains many of the advantages of the direction conversion receiver, for example, highly-programmable channel selection essential to aggressive carrier aggregation.

The double conversion receiver architecture may be applied to multi-carrier reception. In, e.g., a dual-carrier double conversion receiver, one receiver branch may receive and process a first carrier, while another receiver branch receives and processes a second carrier. By selecting appropriate LO frequencies and mixer parameters, the second receiver branch may share LOs and mixers with the first branch, to conserve hardware.

FIG. 1 depicts a portion of a representative dual-carrier double conversion receiver. In this particular example, the receiver is operative in an LTE downlink employing intra-band, non-contiguous carrier aggregation, although the principles of the present invention are applicable to other receivers and systems. The receiver, in this example, receives a composite, carrier aggregation signal at an antenna, which is low-noise amplified. The receiver includes an RF LO frequency generator and an IF LO frequency generator. An RF down-converter comprises two mixers, driven by two corresponding RF LO frequency signals in Quadrature phase, and low-pass filters. The resulting IF signals are then further mixed with IF LO frequency signals having different phases. The resulting baseband frequency signals are combined in two receiver branches, or signal processing paths. An upper receiver branch receives and process a signal modulated onto a 20 MHz carrier frequency, while a lower receiver branch receives and processes a signal modulated onto a non-contiguous, 5 MHz carrier frequency.

The modulated signals may comply with any communication protocol, such as for example Wideband Code Division Multiple Access (WCDMA). In some embodiments, the communication protocol may comprise Orthogonal Frequency Division Multiplexing (OFDM). As known in the art, OFDM signals are modulated onto a plurality of subcarriers which collectively occupy the carrier bandwidth. As used herein, "carrier bandwidth" refers to the frequency of a carrier onto which one or more signals is modulated. A carrier may comprise a single carrier occupying the specified bandwidth (e.g., a spread-spectrum carrier), or may comprise a plurality of subcarriers which collectively occupy the specified bandwidth.

One drawback to a dual-carrier double conversion receiver such as that depicted in FIG. 1 is the sensitivity to imbalance between the In-phase (I) and Quadrature (Q) components of a received signal (known as IQ imbalance) stemming from the shared, gain- and phase-imbalanced LOs and mixers. IQ imbalance is considered a major impairment source in radio receivers, particularly in OFDM systems.

IQ imbalance arises from imbalanced RF/analog circuitry, which includes LO, mixer, filter, ADC, etc. RF/analog circuitry can be calibrated by controlling some circuit parameters, or the IQ imbalance can be compensated by digital signal processing in the digital baseband. Digital compensation of IQ imbalance has many advantages over analog calibration. For example, in principle, it can work with any radios, since it does not require a dedicated interface between radio circuitry and digital baseband. Major benefits of IQ imbalance compensation are to relax the design requirement on IQ imbalance, and overcome the fundamental limitation of analog components (or, given the same design effort, to improve the receiver performance).

Digital compensation of IQ imbalance is also applicable to double conversion receivers for carrier aggregation, including intra-band, non-contiguous carrier aggregation. One distinction, as compared to conventional IQ imbalance compensation, is the need for joint compensation over multiple receiver branches receiving and processing multiple carriers. This is unsurprising, considering that IQ imbalance causes inter-carrier coupling, such that signals processed in each receiver branch includes its own carrier, as well as the other carriers (i.e., signals processed in other receiver branches).

SUMMARY

According to one or more embodiments of the present invention described and claimed herein, digital IQ imbalance estimation and compensation is facilitated (indeed, in some cases, made possible at all), by shaping the frequency response of receiver branches in novel and nonobvious ways, as compared to prior art receivers. In particular, in a multi-carrier receiver, the frequency response of signal processing elements in at least one receiver branch is set to not fully attenuate received signals in a frequency band of interest. The frequency band of interest is greater than the carrier bandwidth of the received signal processed by that receiver branch. In some embodiments, the received signal is not attenuated, and adjacent interfering signals are partially attenuated. This allows information regarding the interfering signals to appear in an IQ imbalance-induced, inter-carrier image of the signals in another receiver branch, facilitating digital estimation and compensation of IQ imbalance.

One embodiment relates to a method of receiving and processing at least first and second communication signals concurrently in respective first and second branches of a receiver. The first signal is modulated onto a first carrier having a first bandwidth, and the second signal is modulated onto a second carrier having a second bandwidth. The first and second signals are received. The frequency response of signal processing elements in the first receiver branch is set to a frequency response sufficient to not attenuate at least the first signal, and the first signal is processed in the first receiver branch. The frequency response of signal processing elements in the second receiver branch is set to a frequency response sufficient to not fully attenuate received signals within a frequency band of interest, the width of which is greater than the carrier bandwidth of the second signal, and the second signal is processed in the second receiver branch. The imbalance between I and Q components of the first and second received signals is estimated, and the estimated IQ imbalance is jointly compensated over the first and second received signals.

Another embodiment relates to a receiver operative to receive at least first and second communication signals. The first signal is modulated onto a first carrier having a first bandwidth, and the second signal is modulated onto a second carrier having a second bandwidth. The receiver includes a first receiver branch comprising signal processing elements having a first frequency response and operative to receive and process the first signal. The receiver also includes a second receiver branch comprising signal processing elements having a second frequency response and operative to receive and process the second signal. The frequency response of signal processing elements in the second receiver branch is sufficient to not fully attenuate received signals within a frequency band of interest, the width of which is greater than the carrier bandwidth of the second signal.

DETAILED DESCRIPTION

Digital compensation of IQ imbalance includes two steps: imbalance estimation and imbalance compensation. This is also the case for carrier aggregation. Details of digital compensation of IQ imbalance for carrier aggregation are presented in pending U.S. patent application Ser. No. 13/045,386.

Figure 2:
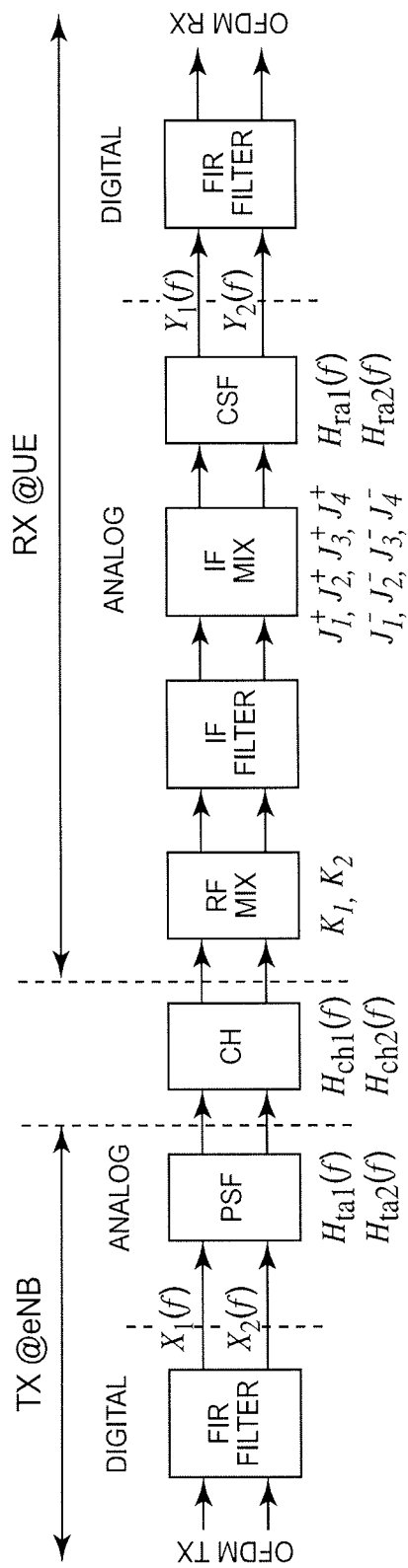
FIG. 2 is a functional block diagram of a communication signal path and various sources of signal impairments.

A double conversion receiver can be modeled as shown in FIG. 2. The transmitter resides in an eNodeB, and includes digital Finite Impulse Response (FIR) filters and analog pulse shape filters (PSF). The frequency responses of the pulse shape filter for the two carriers are represented by $H_{ta1}(f)$ and $H_{ta2}(f)$. The transmitted signals for the two carriers propagate through multipath fading channels (CH) represented by $H_{ch1}(f)$ and $H_{ch2}(f)$. The receiver resides in UE, and includes RF mixers with imbalance parameters $K_1$ and $K_2$, analog IF filters, IF mixers with imbalance parameters $J_i^+$ and $J_i^-$, analog channel selection filters (CSF) represented by $H_{ra1}(f)$ and $H_{ra2}(f)$, and FIR filters. The digital baseband part, including OFDM processing, is omitted for simplicity, but the model assumes the digital baseband, since embodiments of the present invention involve digital compensation of IQ imbalance.

Figure 1:
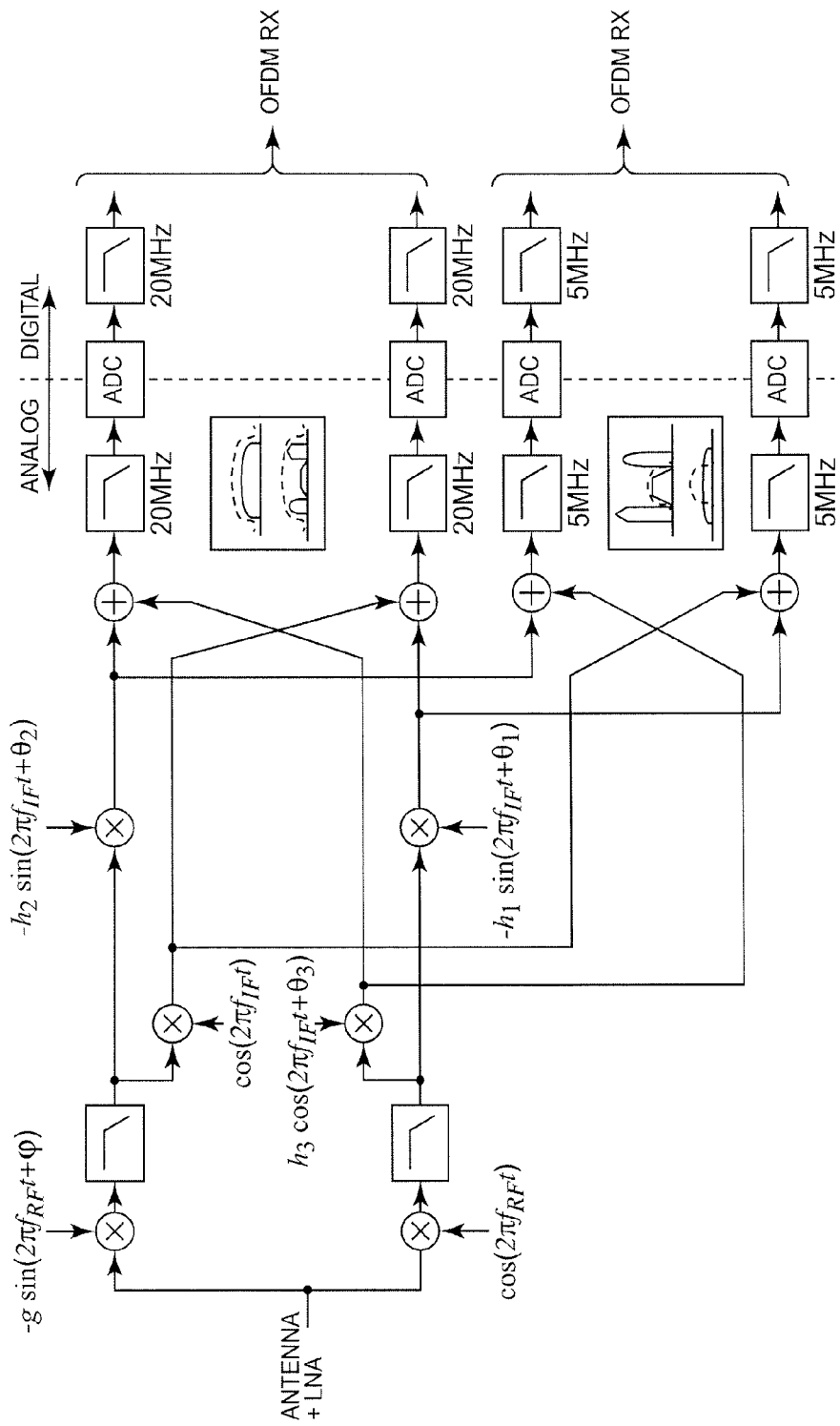
FIG. 1 is a functional circuit schematic of a dual-carrier, double-conversion receiver according to the prior art.

As exemplified in FIG. 1, the double conversion receiver has a separate branch for each carrier. Assume that all the filters are perfectly balanced within a branch. In other words, there is no intra-carrier imbalance, which is conventionally called IQ imbalance (in practice the IQ imbalance arises largely from the RF mixing stage). The received signal of the two branches, $Y_1(f)$ and $Y_2(f)$, are represented as $$\begin{pmatrix} Y_1(f) \\ Y_2^*(-f) \\ Y_1(f) \\ Y_2^*(-f) \end{pmatrix} = Q_a(f) \begin{pmatrix} X_1(f) \\ X_2^*(-f) \\ X_1(f) \\ X_2^*(-f) \end{pmatrix} \quad (1)$$

where the frequency response of transceiver is modeled by a frequency-dependent matrix $Q_a(f)$ defined as $$Q_a(f) := \begin{pmatrix} H_{ra1}(f) & 0 & 0 & 0 \\ 0 & H_{ra1}^*(-f) & 0 & 0 \\ 0 & 0 & H_{ra2}(f) & 0 \\ 0 & 0 & 0 & H_{ra2}^*(-f) \end{pmatrix} \times \quad (2)$$

$$\begin{pmatrix} P_1^+(f) & P_2^+(f) & P_3^+(f) & P_4^+(f) \\ P_2^{+*}(-f) & P_1^{+*}(-f) & P_4^{+*}(-f) & P_3^{+*}(-f) \\ P_1^-(f) & P_2^-(f) & P_3^-(f) & P_4^-(f) \\ P_2^{-*}(-f) & P_1^{-*}(-f) & P_4^{-*}(-f) & P_3^{-*}(-f) \end{pmatrix} \times$$

$$\begin{pmatrix} H_{ch1}(f) & 0 & 0 & 0 \\ 0 & H_{ch1}^*(-f) & 0 & 0 \\ 0 & 0 & H_{ch2}(f) & 0 \\ 0 & 0 & 0 & H_{ch2}^*(-f) \end{pmatrix} \times$$

$$\begin{pmatrix} H_{ta1}(f) & 0 & 0 & 0 \\ 0 & H_{ta1}^*(-f) & 0 & 0 \\ 0 & 0 & H_{ta2}(f) & 0 \\ 0 & 0 & 0 & H_{ta2}^*(-f) \end{pmatrix}.$$

For simplicity, $Q_a(f)$ represents the analog part only, although it is possible to include the digital part, i.e., the FIR filters of both transmitter and receiver. Here, the second matrix of the right-hand side of equation (2), $$\begin{pmatrix} P_1^+(f) & P_2^+(f) & P_3^+(f) & P_4^+(f) \\ P_2^{+*}(-f) & P_1^{+*}(-f) & P_4^{+*}(-f) & P_3^{+*}(-f) \\ P_1^-(f) & P_2^-(f) & P_3^-(f) & P_4^-(f) \\ P_2^{-*}(-f) & P_1^{-*}(-f) & P_4^{-*}(-f) & P_3^{-*}(-f) \end{pmatrix}$$

represents the frequency response contributed by RF mixing stage, IF filter and IF mixing stage.

If the two carriers have the same bandwidth, and the two channel selection filters are designed to have exactly the same bandwidth—that is, there is no inter-carrier imbalance (more accurately, inter-branch imbalance) in the channel selection filters, i.e., $$H_{ra1}(f) = H_{ra2}(f) \quad (3)$$

then equation (2) can be re-written as $$Q_a(f) := \begin{pmatrix} P_1^+(f) & P_2^+(f) & P_3^+(f) & P_4^+(f) \\ P_2^{+*}(-f) & P_1^{+*}(-f) & P_4^{+*}(-f) & P_3^{+*}(-f) \\ P_1^-(f) & P_2^-(f) & P_3^-(f) & P_4^-(f) \\ P_2^{-*}(-f) & P_1^{-*}(-f) & P_4^{-*}(-f) & P_3^{-*}(-f) \end{pmatrix} \times \quad (4)$$

$$\begin{pmatrix} H_{ra1}(f) & 0 & 0 & 0 \\ 0 & H_{ra1}^*(-f) & 0 & 0 \\ 0 & 0 & H_{ra2}(f) & 0 \\ 0 & 0 & 0 & H_{ra2}^*(-f) \end{pmatrix} \times$$

$$\begin{pmatrix} H_{ch1}(f) & 0 & 0 & 0 \\ 0 & H_{ch1}^*(-f) & 0 & 0 \\ 0 & 0 & H_{ch2}(f) & 0 \\ 0 & 0 & 0 & H_{ch2}^*(-f) \end{pmatrix} \times$$

$$\begin{pmatrix} H_{ta1}(f) & 0 & 0 & 0 \\ 0 & H_{ta1}^*(-f) & 0 & 0 \\ 0 & 0 & H_{ta2}(f) & 0 \\ 0 & 0 & 0 & H_{ta2}^*(-f) \end{pmatrix}.$$

Assuming that all the IQ imbalance parameters are estimated accurately, the IQ imbalance can be compensated completely as $$\begin{pmatrix} Z_1(f) \\ Z_2^*(-f) \\ Z_1(f) \\ Z_2^*(-f) \end{pmatrix} = \begin{pmatrix} P_1^+(f) & P_2^+(f) & P_3^+(f) & P_4^+(f) \\ P_2^{+*}(-f) & P_1^{+*}(-f) & P_4^{+*}(-f) & P_3^{+*}(-f) \\ P_1^-(f) & P_2^-(f) & P_3^-(f) & P_4^-(f) \\ P_2^{-*}(-f) & P_1^{-*}(-f) & P_4^{-*}(-f) & P_3^{-*}(-f) \end{pmatrix}^{-1} \begin{pmatrix} Y_1(f) \\ Y_2^*(-f) \\ Y_1(f) \\ Y_2^*(-f) \end{pmatrix}. \quad (5)$$

Even though the compensated signal from equation (5)

$$\begin{pmatrix} Z_1(f) \\ Z_2^*(-f) \\ Z_1(f) \\ Z_2^*(-f) \end{pmatrix}$$

includes the "distortion" given by analog filters and multipath fading, it can be compensated (also known as being "equalized") by conventional digital baseband processing. That is, there is no need for inter-carrier processing (as opposed to equation (5)), since it does not introduces any IQ imbalance.

If the IF filter is sufficiently balanced (or it has significantly less impact than the other imbalance sources, such as RF mixer and IF mixer), the frequency response contributed by RF mixing stage, IF filter and IF mixing stage usually becomes frequency-flat. That is, $$\begin{pmatrix} P_1^+(f) & P_2^+(f) & P_3^+(f) & P_4^+(f) \\ P_2^{+*}(-f) & P_1^{+*}(-f) & P_4^{+*}(-f) & P_3^{+*}(-f) \\ P_1^-(f) & P_2^-(f) & P_3^-(f) & P_4^-(f) \\ P_2^{-*}(-f) & P_1^{-*}(-f) & P_4^{-*}(-f) & P_3^{-*}(-f) \end{pmatrix} = \quad (6)$$

$$\begin{pmatrix} P_1^+ & P_2^+ & P_3^+ & P_4^+ \\ P_2^{+*} & P_1^{+*} & P_4^{+*} & P_3^{+*} \\ P_1^- & P_2^- & P_3^- & P_4^- \\ P_2^{-*} & P_1^{-*} & P_4^{-*} & P_3^{-*} \end{pmatrix}.$$

In this case, the IQ imbalance is called frequency-independent, in the sense that the IQ imbalance parameters that should be estimated are frequency-independent. This eases the IQ imbalance compensation. It also eases the imbalance estimation significantly, since the observation over a small fraction of the bandwidth may suffice. More importantly, it is sometimes impossible to estimate frequency-dependent IQ imbalance, e.g., if the pilot signal does not cover the entire bandwidth. Accordingly, it is quite beneficial to keep the IQ imbalance frequency-independent.

In many of the existing remedies for IQ imbalance, it is assumed that all the receiver branches have exactly the same frequency response. In other words, when it comes to IQ imbalance, the inter-carrier imbalance (in terms of bandwidth) is not of interest, since it is the intra-carrier imbalance (i.e., IQ imbalance) that causes the detrimental coupling.

In practice, however, inter-carrier imbalance may exist, possibly because of the channel selection filters with frequency responses tuned to different bandwidths. For example, it is likely that the carriers with different bandwidths are aggregated together. In this case, the frequency response of each branch is determined by the bandwidth of the carrier that the branch receives. Also, even when the carriers have the same bandwidth, the respective receiver branches may not have exactly the same frequency response, primarily because of circuit component mismatch introduced in manufacturing, but also due to non-symmetric chip layout. The former can be seen as intentional imbalance, while the latter can be seen as unintentional imbalance.

If the carriers have different bandwidths, $Q_a(f)$ becomes ill-conditioned for a certain fraction of bandwidth, i.e., where the receiver branch processing the narrow-bandwidth carrier is attenuating, while the receiver branch processing the wide-bandwidth carrier is not attenuating. This is the situation depicted in FIG. 1, where the first signal, received and processed by the first (upper) receiver branch, has a 20 MHz carrier bandwidth and the second signal, received and processed by the second (lower) receiver branch, has a 5 MHz bandwidth. The received signal in each receiver branch is depicted, together with the image of the signal received in the other receiver branch, due to IQ imbalance-induced, inter-carrier coupling (as indicated, the image is in the form of the complex conjugate of the signal processed by the other receiver branch). The frequency response of signal processing elements in the receiver branch is indicated as a dashed line, depicting signal attenuation as a function of frequency, on the signal diagrams.

Figure 3:
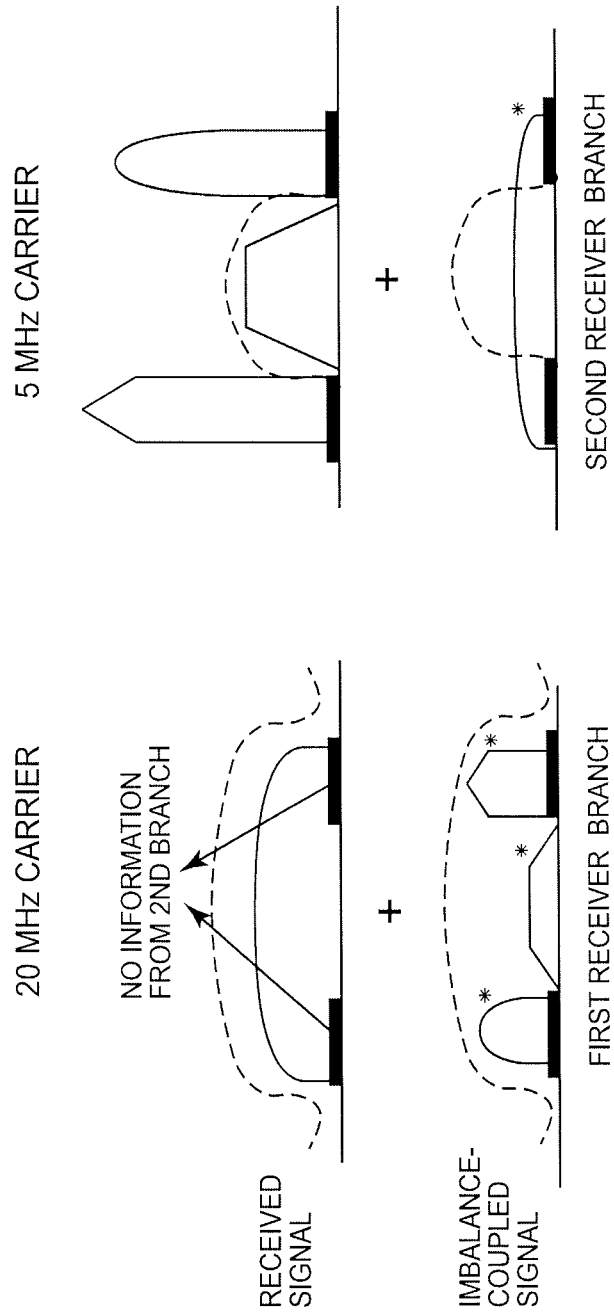
FIGS. 3A and 3B depict conventional frequency response shaping for dual-carrier receivers processing signals having different carrier bandwidths.

These signal diagrams are depicted in greater detail in FIG. 3, where FIG. 3A depicts the first (20 MHz) signal in the first receiver branch (upper figure), together with the image of the second (5 MHz) signal (lower figure). Similarly, FIG. 3B depicts the second (5 MHz) signal (upper figure), together with the image of the first (20 MHz) signal (lower figure). As shown, the frequency response of signal processing elements (primarily the channel selection filter) in the first receiver branch is set to 20 MHz, and the frequency response of signal processing elements in the second receiver branch is set to 5 MHz. In both cases, but as illustrated only for the second (5 MHz) signal, the frequency response of the receiver branches passes the desired signal, and attenuates nearby interfering signals. This is desirable, and hence comprises the conventional practice, since the interference does not convey any relevant communication information and, moreover, may saturate the ADC or make the quantization error stronger.

However, consider the frequency ranges where $|H_{ra1}(f)|>0$ and $H_{ra2}(f) \approx 0$—that is, the frequencies above and below the 5 MHz carrier, where the interfering signals are fully attenuated. In these ranges, from equation (2), the elements of the third and fourth rows of $Q_a(f)$ become almost zero, and thus $Q_a(f)$ is in effect singular. As a result, the compensation in equation (5) leads to severe noise enhancement. Moreover, the required imbalance estimation becomes extremely sensitive to noise, since some of the parameters to estimate are much smaller than the others. This is a critical issue, especially when a strong interference (e.g., the power of which is a few tens of dB higher than that of the desired signal) is placed in the proximity of the narrow-bandwidth carrier, and is coupled to the wide-bandwidth carrier because of inter-carrier coupling introduced by IQ imbalance.

In some cases, IQ imbalance compensation is impossible, due to the loss of information in the attenuated portions of the received signal(s). For example, as depicted in FIG. 3A, the image of adjacent channel interference (that is, the interference adjacent to the second, 5 MHz signal) in the first receiver branch is not attenuated, since the signal processing elements in the first receiver branch have a frequency response of 20 MHz. However, considering FIG. 3B, one sees that the corresponding information about the 20 MHz signal is attenuated from the image in the second receiver branch due to the narrower frequency response (5 MHz) of signal processing elements in the second branch. Thus, digital compensation of IQ imbalance is impossible, because required information is lost due to the attenuation.

Figure 4:
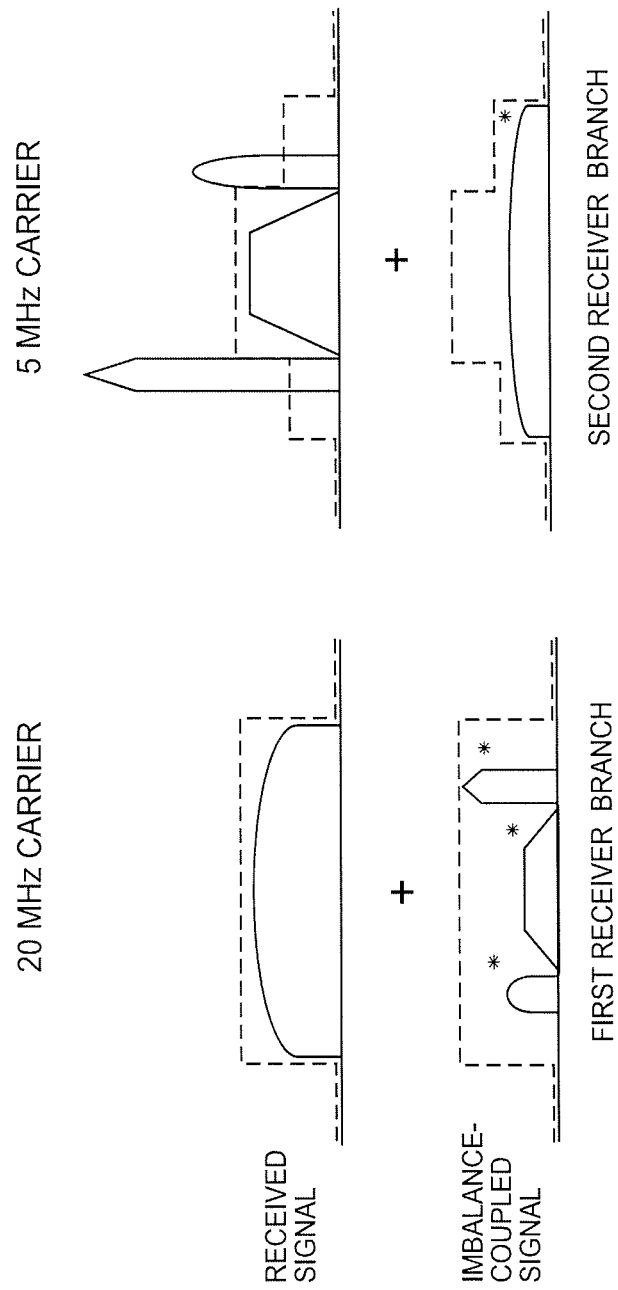
FIGS. 4A and 4B depict frequency response shaping for a receiver branch according to one embodiment of the present invention.

According to one embodiment, in a carrier aggregation environment where received signals have different carrier bandwidth, digital IQ compensation becomes possible by relaxing the attenuation of interfering signals in the receiver branch processing the more narrowband signal. FIGS. 4A and 4B depict this embodiment. As before, the frequency response of signal processing elements in the first receiver branch, processing the 20 MHz carrier bandwidth signal, is set to 20 MHz, as depicted in FIG. 4A. FIG. 4B depicts a hybrid frequency response of signal processing elements in the second receiver branch, which receives and processes a 5 MHz carrier bandwidth signal, together with significant interfering signals outside of the 5 MHz carrier bandwidth. According to this embodiment, the interfering signals are not fully attenuated.

A "frequency band of interest" includes both the carrier bandwidth of the second signal (e.g., 5 MHz), and interfering signals outside of the carrier bandwidth of the second signal. Within the frequency band of interest, received signals are not fully attenuated. In particular, the second signal is not attenuated at all (that is, across its carrier bandwidth of 5 MHz), and the interfering signals outside of the carrier bandwidth of the second signal are partially attenuated.

As a result, these interfering signals appear in the IQ imbalance-caused, inter-carrier coupled image in the first receiver branch (i.e., FIG. 4A, lower signal). However, the interfering signals are partially attenuated in the second receiver branch (FIG. 4B, upper signal), so as not to increase the quantization error (by swamping the ADC) in the second receiver branch above an acceptable level (i.e., above a predetermined quantization error threshold). As depicted in FIGS. 4A and 4B, in one embodiment, the overall width of the frequency response pass-band is at least as wide as the carrier bandwidth of the wider received signal (e.g., the 20 MHz, signal in the first receiver branch). However, this is not a limitation of the present invention.

Thus, according to some embodiments, signals received and processed in the second receiver branch are not fully attenuated within a frequency band of interest, which includes the second signal carrier bandwidth and interfering signals outside the second signal carrier bandwidth. As used herein, "not fully attenuated" encompasses (possible) partial attenuation for some signals within the frequency band of interest, such as the interfering signals, as well as no attenuation for the primary signal (e.g., 5 MHz) within the frequency band of interest.

The partial attenuation of surrounding interfering signals within the frequency band of interest addresses a problem that may be significant if the frequency response in the second receiver branch were simply widened out to include the interfering signals, with no attenuation. In that case, the Analog-to-Digital Converter (ADC) becomes susceptible to quantization error, since the Variable Gain Amplifier (VGA) reduces the gain, in response to the interfering signals, to avoid saturation. Accordingly, the quantization error becomes relatively more dominant. This can be critical when the interference has an extremely high power (compared to the dynamic range of ADC). This problem can be alleviated to a certain extent by increasing ADC resolution, possibly, in an adaptive manner. In other words, when strong interference is detected (i.e., interference with power above a pre-defined threshold, but low enough to be accommodated by the maximum ADC resolution), the receiver increases the ADC resolution to allow the interference to pass through ADC, and hence be available for use in digital IQ imbalance compensation (of the 20-MHz branch). One drawback of this approach is increased power consumption. However, partial attenuation of the interfering signals, with no attenuation of the desired signal, as depicted in FIG. 4B, allows for the information of the interfering signals to appear in the image on the 20 MHz receiver branch, without introducing quantization error in the ADC on the 5 MHz receiver branch. Thus, the embodiment of FIGS. 4A, 4B offers a more elegant solution, in some cases, to the interference conundrum than does increasing ADC resolution.

In one embodiment, the degree of partial attenuation of interfering signals is adaptively determined, such as based on the ADC quantization error in the second receiver branch for various levels of attenuation. In this embodiment, the power level of interference is measured or estimated prior to applying any filtering on receiver branch receiving and processing the narrower carrier bandwidth signal. If IQ imbalance compensation is necessary, interfering signals outside the carrier bandwidth of the primary received signal are attenuated only as necessary such that any increased quantization error due to the VGA control is within a performance margin (i.e., a predetermined quantization error threshold).

Figure 5:
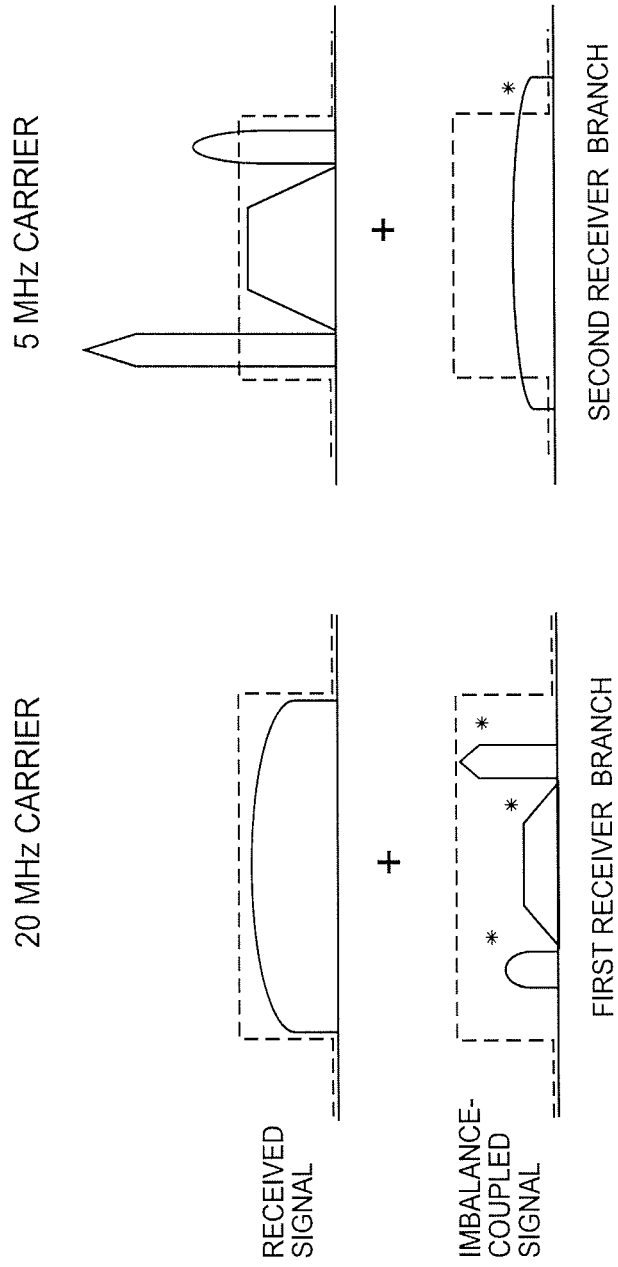
FIGS. 5A and 5B depict frequency response shaping for a receiver branch according to one embodiment of the present invention.

In one embodiment, signals received and processed in the second receiver branch are not attenuated at all within the frequency band of interest, as depicted in FIGS. 5A and 5B. In situations where the interfering signals in the second receiver branch do not adversely impact quantization (that is, quantization error remains below an applicable threshold), this preserves the maximum amount of information in the regions where $|H_{ra1}(f)|>0$ and $H_{ra2}(f) \approx 0$, maximizing the effectiveness of digital IQ imbalance compensation. Note that, in the embodiment depicted in FIGS. 5A and 5B, the frequency response of signal processing elements in the second receiver branch is less than that in the first receiver branch. That is, the frequency band of interest is wide enough to include the carrier bandwidth of the second signal and also interfering signals, but is not as wide as the carrier bandwidth of the first signal.

In general, whether interfering signals in the second receiver branch are partially attenuated or not attenuated, and the whether the frequency band of interest in the second branch is as wide as the carrier bandwidth of the first signal, are independent considerations. The combination of these factors in FIGS. 4A-5B is representative only.

Figure 6:
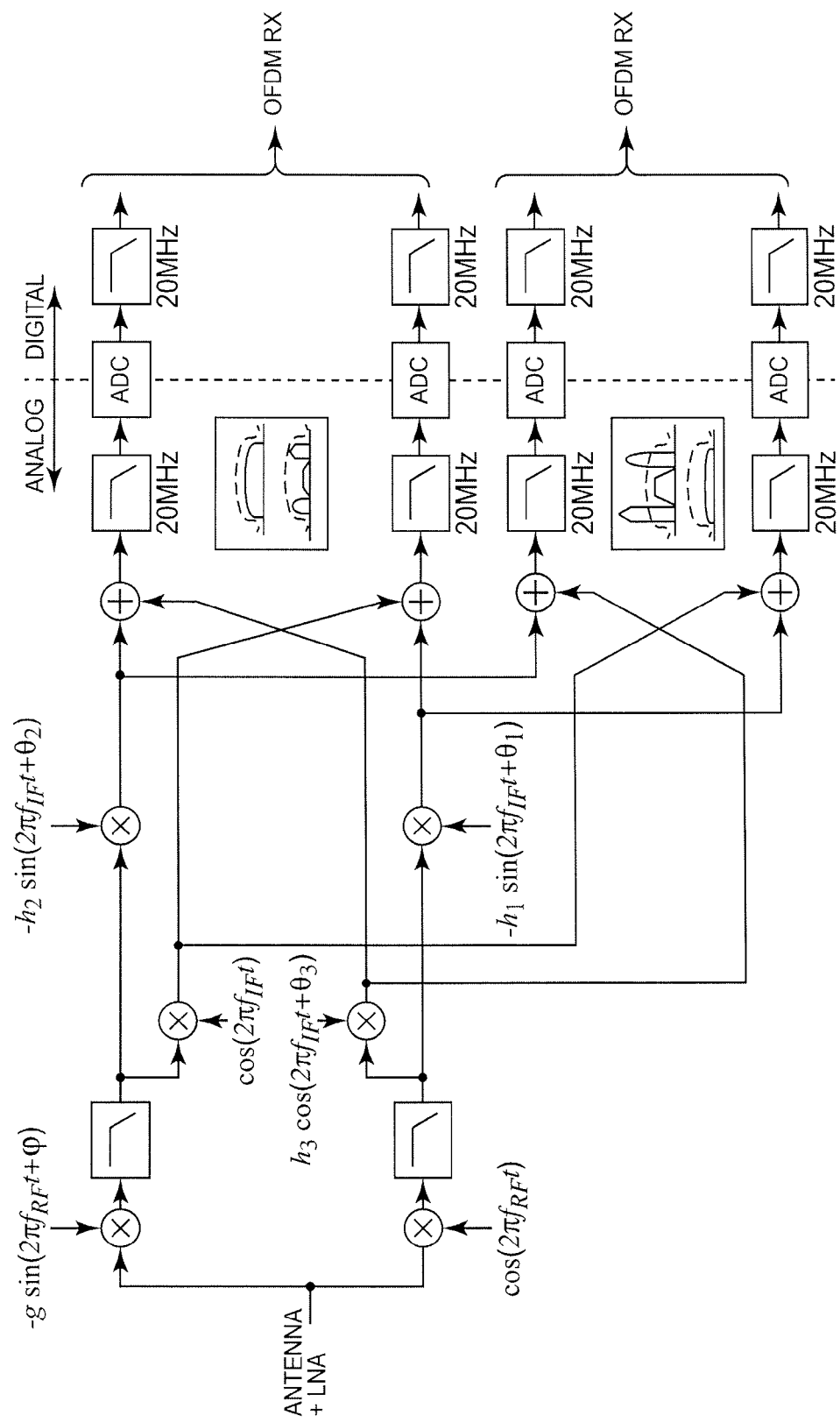
FIG. 6 is a functional circuit schematic of a dual-carrier, double-conversion receiver implementing frequency response shaping according to one embodiment of the present invention.

FIG. 6 depicts a dual-branch, double-conversion receiver operative in a carrier aggregation environment, receiving and processing a first signal having a carrier bandwidth of 20 MHz in a first receiver branch, and a second signal having a carrier bandwidth of 5 MHz in a second receiver branch. Signal processing elements in the first receiver branch are controlled to have a frequency response equal to the carrier bandwidth of the first signal (i.e., 20 MHz). A frequency band of interest in the second receiver branch is defined to include the carrier bandwidth of the second signal (i.e., 5 MHz), as well as interfering signals, yielding a total frequency band of interest in the second receiver branch of 20 MHz. Accordingly, signal processing elements in the second receiver branch are controlled to have a frequency response of 20 MHz as well. In this embodiment, no signals within the frequency band of interest in the second receiver branch are attenuated. This yields the maximum information for digital IQ imbalance estimation and compensation.

Figure 7:
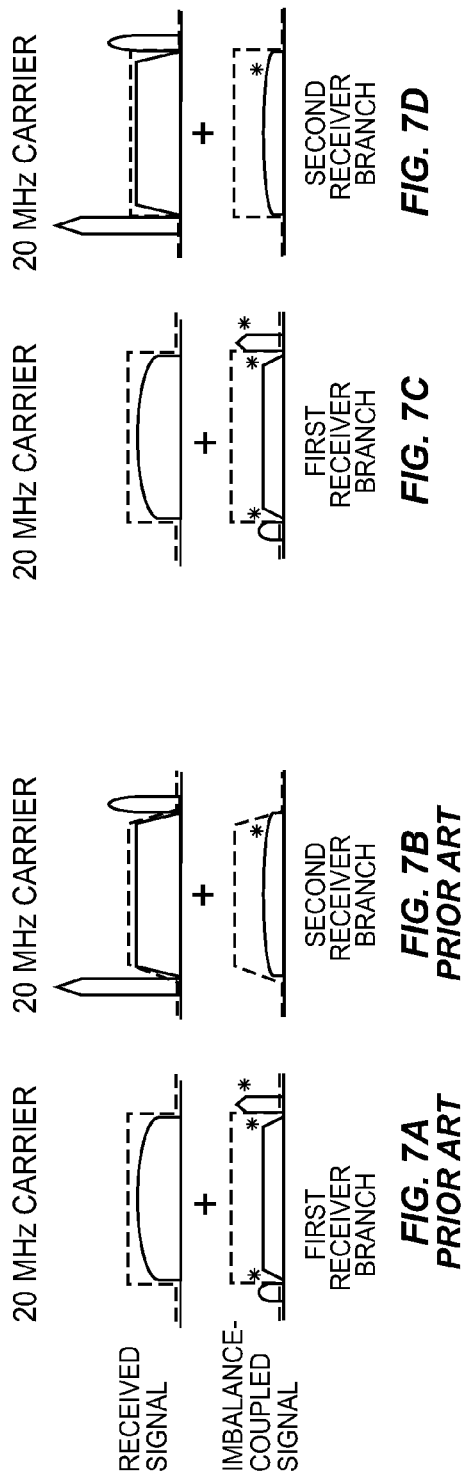
FIGS. 7A and 7B depict conventional frequency response shaping for dual-carrier receivers processing signals having the same carrier bandwidths.
FIGS. 7C and 7D depict frequency response shaping for a receiver processing signals having the same carrier bandwidths according to one embodiment of the present invention.

FIGS. 7A and 7B depict conventional frequency response settings in a carrier aggregation environment where signals received on the first and second receiver branches have the same carrier bandwidth. Note that the frequency response of signal processing elements in the second receiver branch is carefully tailored to pass the received signal, but fully attenuate adjacent interfering signals. For example, as depicted, the roll-off (e.g., of the channel selection filter) has a lower slope, as compared to the frequency response of signal processing elements in the first receiver branch. Because the frequency response in the receiver branches differ, the IQ imbalance must be treated as frequency-dependent in terms of both estimation and compensation, since neither equation (4) nor (6) generally holds. Otherwise, the IQ imbalance compensation may fail to remove the IQ imbalance completely. This increases the difficulty in imbalance estimation and compensation.

In particular, in the absence of equal frequency response between the first and second receiver branches, the IQ imbalance becomes frequency dependent, and equation (6) is not valid. In this case, compensation is performed as $$\begin{pmatrix} Z_1(f) \\ Z_2^*(-f) \\ Z_1(f) \\ Z_2^*(-f) \end{pmatrix} = \begin{pmatrix} P_1^+ & P_2^+ & P_3^+ & P_4^+ \\ P_2^{+*} & P_1^{+*} & P_4^{+*} & P_3^{+*} \\ P_1^- & P_2^- & P_3^- & P_4^- \\ P_2^{-*} & P_1^{-*} & P_4^{-*} & P_3^{-*} \end{pmatrix}^{-1} \begin{pmatrix} Y_1(f) \\ Y_2^*(-f) \\ Y_1(f) \\ Y_2^*(-f) \end{pmatrix}. \quad (7)$$

According to one embodiment, as depicted in FIGS. 7C and 7D, in the case of equal-bandwidth carriers, the frequency response of both receiver branches is set to be exactly the same—that is, both the width of the passband, and the degree of signal attenuation therein, are equal (in the embodiment depicted, no attenuation within the passband).

In some embodiments, calibration may be performed to ensure precise equality in frequency response between the branches (that is, the frequency response between the branches varies less than a predetermined frequency response error). Because such calibration is not part of conventional calibration processes, additional hardware resources may be required, as further discussed herein. In receivers including calibration hardware that operates according to a calibration algorithm, the frequency response calibration in support of IQ imbalance estimation and cancellation may simply be an additional procedure to be invoked on power-up, and/or intermittently during operation.

In one embodiment, calibration is performed by injecting a test signal (e.g., a single-tone signal) into each receiver branch at the output of the IF mixing stage, and the attenuation of the test signal is measured at the output of OFDM processing. The measurement is repeated over the entire frequency band of interest, to test the frequency response of the receiver branch. Signal processing elements in the receiver branches are then adjusted according to the calibration results, to set the frequency response as desired. In receivers having calibration procedures, this process may be included as an additional step.

Alternatively, in one embodiment, where no inter-carrier calibration is performed, frequency-dependence of IQ imbalance is assumed, and IQ estimation and compensation are both performed on a per-subcarrier basis. A test signal may be inserted on every subcarrier and, if a pilot is not provided on every subcarrier, decision-directed estimation may be used for the subcarriers without pilots. Once the IQ imbalance parameters are estimated, the compensation may also be applied to each subcarrier.

In general, the control of frequency response of signal processing elements in (at least) the second receiver branches is applied to most functional blocks that follow the IF mixing stage. For example, in the analog baseband, the frequency response of the Variable Gain Amplifier (VGA) and channel selection filter are set to not fully attenuate signals in the frequency band of interest. The Analog to Digital Conversion (ADC) sampling rate, STF/NTF, quantization level, and the like must also be configured to operate with the frequency response covering the frequency band of interest. In the digital front-end, not only all the digital filters, but also other functions such as interpolators (e.g., Farrow interpolator) must be configured to operate with the frequency response covering the frequency band of interest. In the digital baseband, the Fast Fourier Transform (FFT) function must be configured to operate with the frequency response covering the frequency band of interest.

Figure 8:
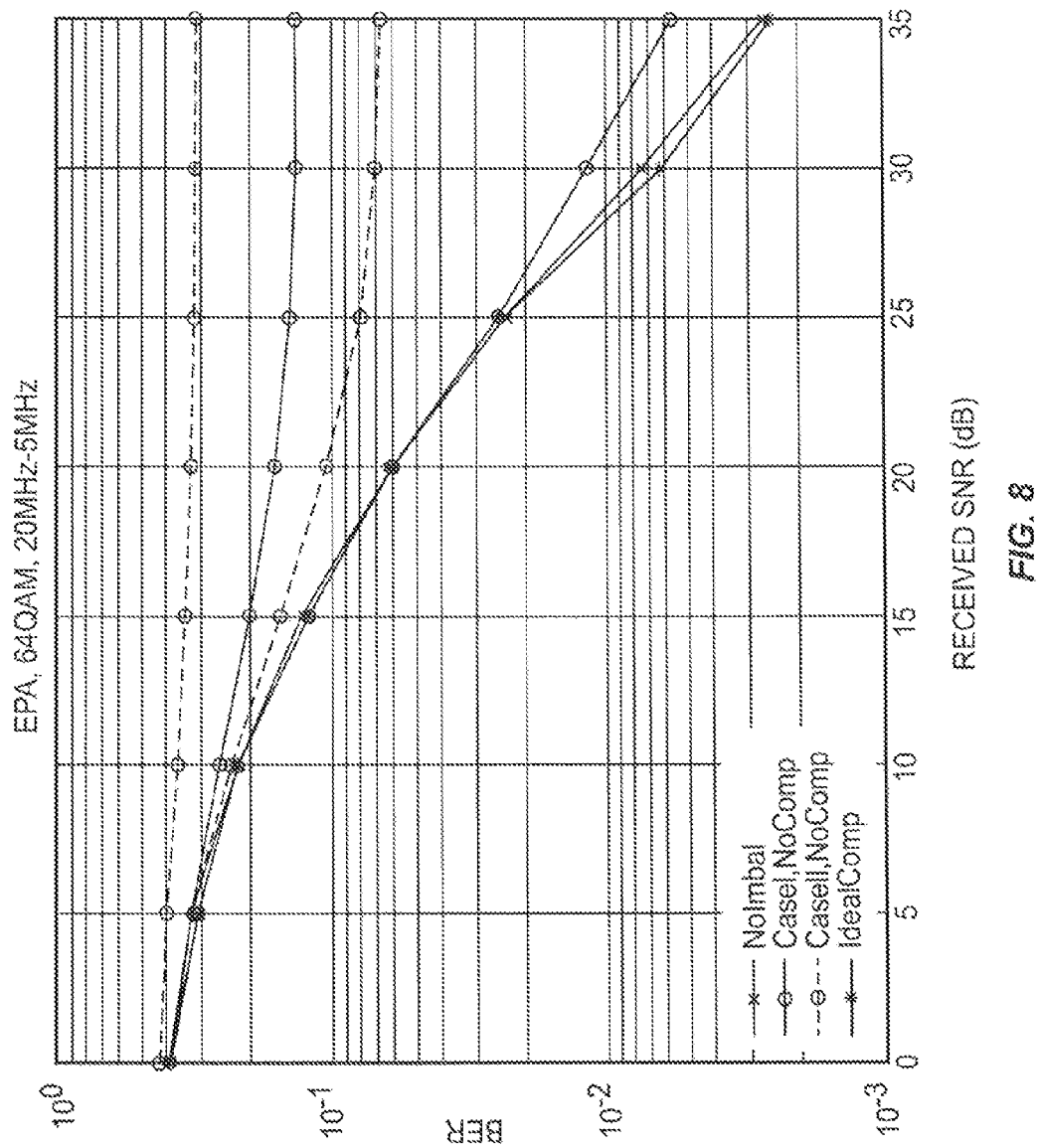
FIG. 8 is a graph of multi-carrier receiver performance under various frequency response shaping conditions.

FIG. 8 is a graph of the Bit Error Rate (BER) performance of digital IQ imbalance compensation with the frequency response control according to embodiments of the present invention. In particular, the graph is based on link-simulation of the receiver depicted in FIG. 6. FIG. 8 demonstrates that digital compensation with ideal IQ imbalance estimation and compensation (indicated by "Ideal/Comp") achieves the performance of perfectly-balanced receiver (e.g., the BER drops with increased SNR, as expected). In FIG. 8, the curve labeled "Case I, NoComp" represents the performance of a 20-MHz carrier, assuming a medium-imbalanced radio (40 dB IRR) without compensation, in the presence of adjacent channel interference around the 5-MHz carrier with the power of 10 dBc and 30 dBc. The curve labeled "Case II, NoComp" is for a highly-imbalanced radio (25 dB IRR) in the same condition.

Figure 9:
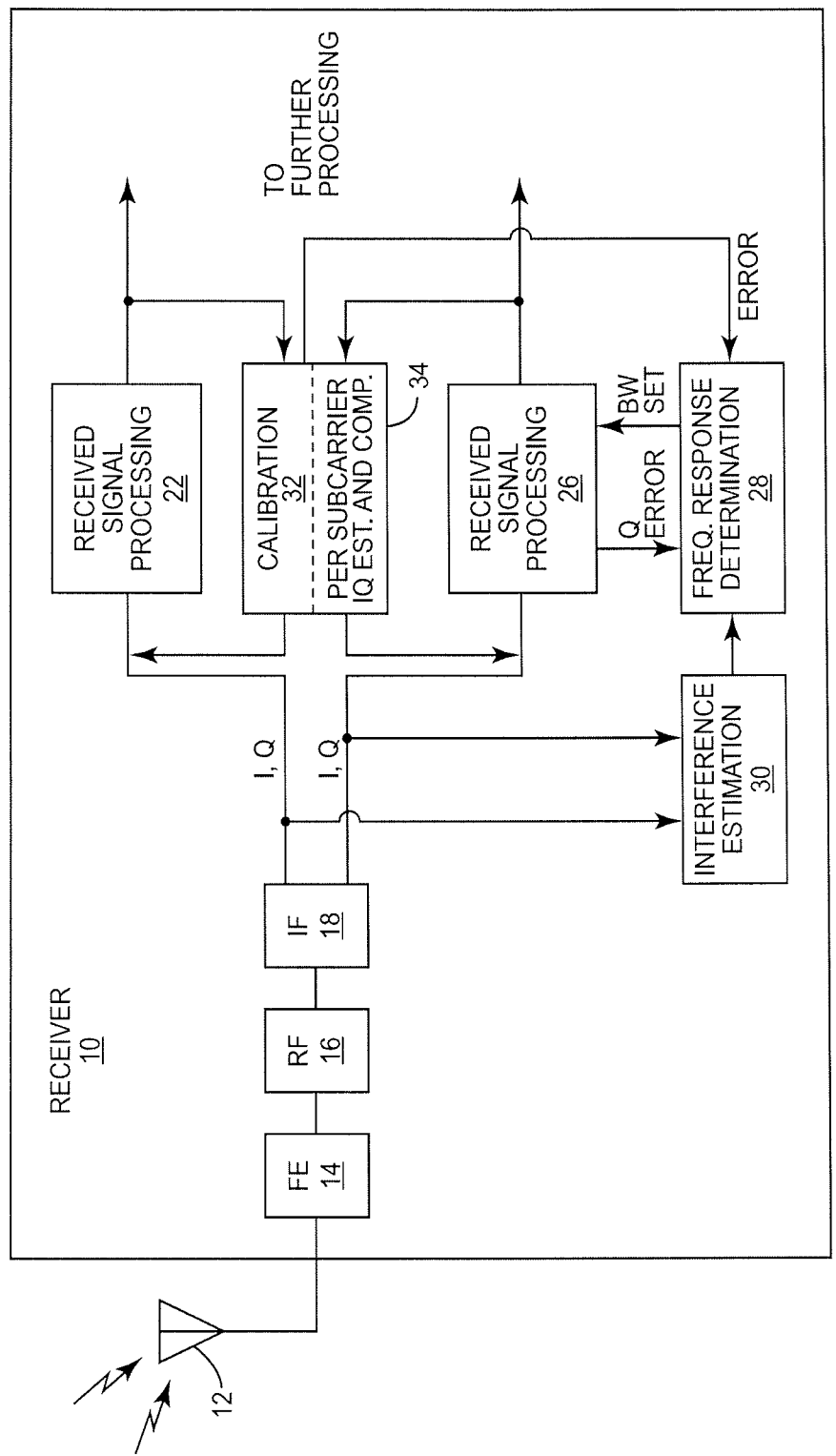
FIG. 9 is a functional block diagram of a multi-carrier wireless communication receiver according to embodiments of the present invention.

FIG. 9 depicts a functional block diagram of portions of a dual-carrier, double-conversion receiver 10 according to embodiments of the present invention. The receiver 10 is operative in a carrier aggregation environment, and receives at least two signals at an antenna 12. The received signals are processed by a front-end circuit 14 and RF mixer 16. As depicted in greater detail in FIG. 6, two receiver branches share the RF 16 and some IF 18 mixer components, outputting the I and Q components of first and second received signals in separate receiver branches. The first signal is processed in the first receiver branch by received signal processing elements 22, and the second signal is processed in the second receiver branch by received signal processing elements 26.

The frequency response of signal processing elements 26 in the second receiver branch is determined in a frequency response determination function 28. As described herein, the frequency response of signal processing elements 26 in the second receiver branch is set to be sufficient (in both frequency and attenuation level) to not fully attenuate received signals within a frequency band of interest, where the width of the frequency band of interest is greater than the carrier bandwidth of the second signal. In one embodiment, this determination is made at least partially in consideration of an estimate the interference of interfering signals within the frequency band of interest, as determined by an interference estimation function 30, in combination with an indication of the quantization error for various levels of attenuation of the interfering signals.

In one embodiment, a calibration function 32 is operative to inject test signals, across a range of frequencies, into the signal processing elements 22, 26 of the first and second receiver branches, respectively, and monitor the attenuation thereof. In response, the calibration function 32 alters the attenuation, frequency response, or both, of at least signal processing elements 26 in the second receiver branch, via the frequency response determination function 28. In one embodiment, a per-subcarrier IQ estimation and compensation function 34 is operative to perform IQ estimation and compensation on a per-subcarrier basis. In this embodiment, decision-directed estimation may be used for subcarriers that lack pilots.

Those of skill in the art will appreciate that one or more of the received signal processing elements 22, 26 of the first and second receiver branches, respectively; the frequency response determination function 28; the interference estimation function 30; the calibration function 32; and the per-subcarrier IQ estimation and compensation function 34 may be implemented in hardware (e.g., as discrete components or appropriately programmed programmable logic); as a combination of hardware and configuring or controlling firmware; as software modules executed on an appropriate processor or digital signal processor (DSP); or any appropriate combination of such technologies.

Figure 10:
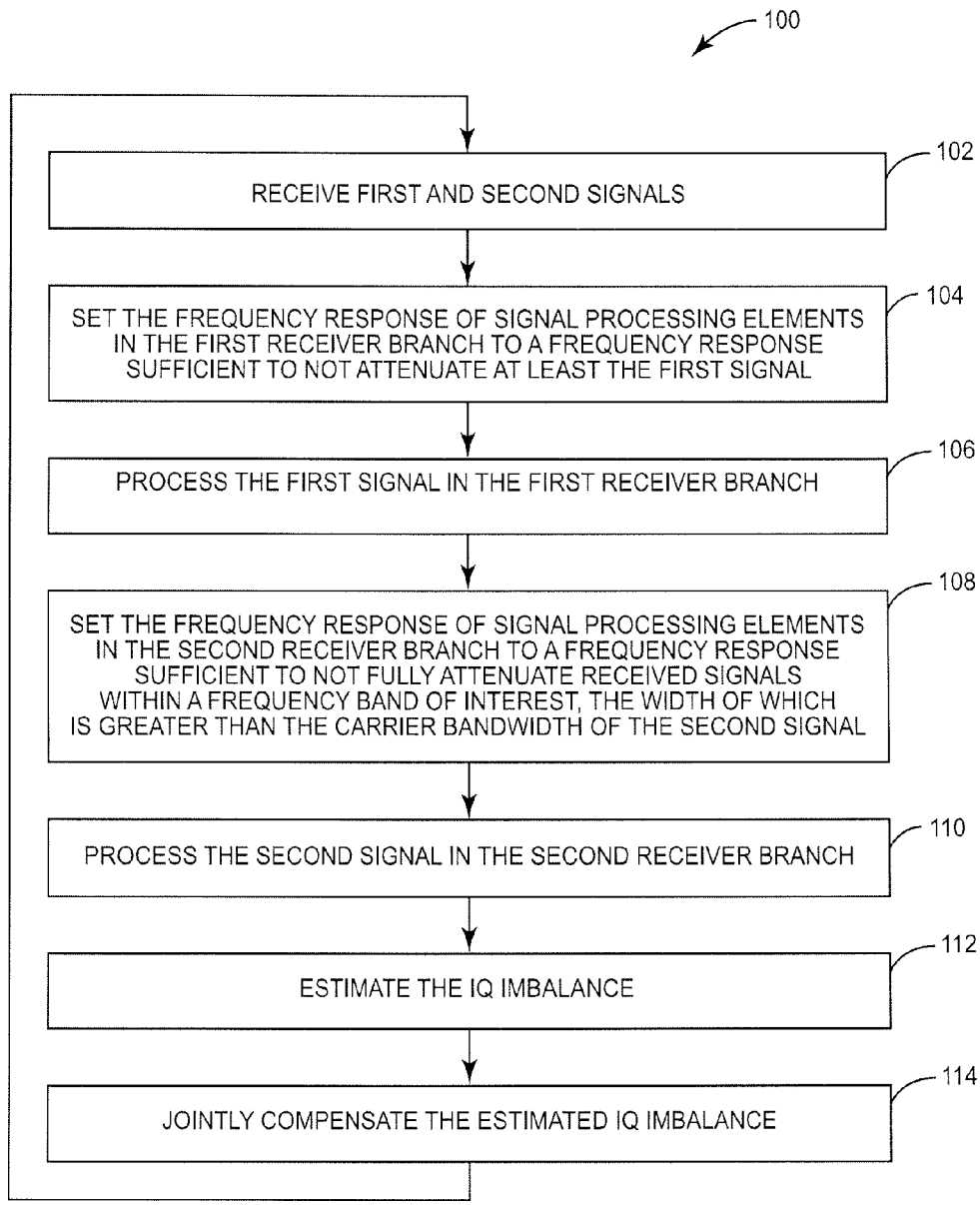
FIG. 10 is a flow diagram of a method of receiving and processing two wireless communication signals concurrently.

FIG. 10 depicts a method 100 of receiving and processing at least first and second wireless communication signals concurrently in respective first and second branches of a receiver. The first signal is modulated onto a first plurality of subcarriers having a first bandwidth, and the second signal is modulated onto a second plurality of subcarriers having a second bandwidth. The first and second signals are received (block 102) and front-end processed. The frequency response of signal processing elements in the first receiver branch is set to a width sufficient to not attenuate at least the first signal (i.e., the carrier bandwidth of the first signal) (block 104). The first signal is processed in the first receiver branch (block 106). The frequency response of signal processing elements in the second receiver branch is set to a width sufficient to not fully attenuate received signals within a frequency band of interest. The frequency band of interest is defined as having a width greater than the carrier bandwidth of the second signal (block 108) and may include interfering signals adjacent to the second signal carrier bandwidth. The second signal is processed in the second receiver branch (block 110). The IQ imbalance is then estimated (block 112) and jointly compensated between the first and second receiver branches (block 114).

Embodiments of the present invention present numerous advantages over frequency response shaping for multi-carrier receivers of the prior art. By setting the frequency response of receiver branches processing received signals with narrower carrier bandwidths to cover a frequency band of interest that is wider than the carrier bandwidths, IQ imbalance can be compensated almost completely. This particularly true in the presence of strong adjacent channel interference. In sharp contrast, without effective IQ imbalance compensation as enabled by embodiments of the present invention, conventional receivers experience severe error floor, as shown in FIG. 8.

IQ imbalance estimation and compensation according to embodiments of the present invention relaxes the design requirement dramatically. Without such IQ imbalance compensation, the IRR needs to be as high as 63 dB in order to support 64QAM in the presence of 30 dBc interference.

By adaptively changing the ADC resolution, the impact of quantization error due to the bandwidth control and the additional power consumption can be minimized.

By calibrating multiple receiver branches before IQ imbalance estimation and compensation, digital compensation of IQ imbalance may be possible even when the pilot signal is not available over the entire bandwidth.

By conducting frequency-dependent imbalance estimation and compensation, the impact of inter-carrier imbalance can be mitigated.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of receiving and processing at least first and second communication signals concurrently in respective first and second branches of a receiver, wherein the first signal is modulated onto a first carrier having a first bandwidth, and the second signal is modulated onto a second carrier having a second bandwidth, each branch operative to process In-phase (I) and Quadrature (Q) components of the received signals, the method comprising the steps of:
receiving the first and second signals;
setting the frequency response of signal processing elements in the first receiver branch to a frequency response sufficient to not attenuate at least the first signal;
processing the first signal in the first receiver branch;
setting the frequency response of signal processing elements in the second receiver branch to a frequency response sufficient to not fully attenuate received signals within a frequency band of interest, the width of which is greater than the carrier bandwidth of the second signal, so as to include information from at least part of the first signal, outside of the carrier bandwidth of the second signal, in an image of the first signal appearing in the second receiver branch due to IQ imbalance;
processing the second signal in the second receiver branch;
estimating the IQ imbalance in the first and second received signals; and
jointly compensating the estimated IQ imbalance over the first and second received signals.

2. The method of claim 1 wherein setting the frequency response of signal processing elements in a receiver branch comprises setting the frequency responses of at least an analog variable gain amplifier and an analog channel selection filter in the receiver branch.

3. The method of claim 1 wherein setting the frequency response of signal processing elements in a receiver branch comprises setting the frequency response of digital filters and interpolators in the receiver branch.

4. The method of claim 1 wherein setting the frequency response of signal processing elements in a receiver branch comprises configuring a digital baseband Fast Fourier Transformer (FFT) to operate with the determined frequency response.

5. The method of claim 1 wherein the first signal carrier bandwidth is broader than the second signal carrier bandwidth, and wherein setting the frequency response of signal processing elements in the second receiver branch comprises setting the frequency response to be at least as wide as the bandwidth of the first signal.

6. The method of claim 5 wherein a frequency response sufficient to not fully attenuate received signals within a frequency band of interest comprises a frequency response sufficient to not attenuate received signals within the frequency band of interest.

7. The method of claim 5 wherein a frequency response sufficient to not fully attenuate received signals within a frequency band of interest comprises a frequency response sufficient to not attenuate the second signal, and to partially attenuate interfering signals within the frequency band of interest.

8. The method of claim 7 wherein the degree of partial attenuation of interfering signals within the frequency band of interest is determined by the quantization error in the second receiver branch introduced by the interfering signals.

9. The method of claim 1 wherein the first and second signal carrier bandwidths are equal, and wherein setting the frequency response of signal processing elements in the second receiver branch comprises setting the frequency response to match the frequency response of signal processing elements in the first receiver branch.

10. The method of claim 1 wherein the first signal carrier bandwidth is broader than the second signal carrier bandwidth, and wherein setting the frequency response of signal processing elements in the second receiver branch comprises the steps of:
estimating the power level of interference in the first and second signals;
if the interference power level is sufficient to increase the interference power originating from IQ imbalance above a predetermined threshold but insufficient to increase quantization error in the second receiver branch above a predetermined quantization error threshold, setting the frequency response of signal processing elements in the second receiver branch to not fully attenuate interfering signals within the frequency band of interest; and
otherwise, setting the frequency response equal to the carrier bandwidth of the second signal.

11. The method of claim 1 wherein setting the frequency response of signal processing elements in the second receiver branch comprises setting the frequency response to be equal to the frequency response of signal processing elements in the first receiver branch; and further comprising
calibrating the first and second receiver branches to have the same frequency response to within a predetermined frequency response error threshold.

12. The method of claim 11 wherein calibrating the first and second receiver branches comprises performing the calibration when the receiver is initially powered to an operative state.

13. The method of claim 11 wherein calibrating the first and second receiver branches comprises performing the calibration at predetermined intervals.

14. The method of claim 11 wherein calibrating the first and second receiver branches comprises injecting a test signal into at least one receiver branch and measuring its attenuation at the output of signal processing in the branch.

15. The method of claim 14 wherein the test signal comprises a single-tone signal.

16. The method of claim 15 further comprising repeating the calibration test while altering the frequency of the single-tone test signal over the first bandwidth.

17. The method of claim 16 wherein the frequency of the single-tone test signal is varied over a subset of subcarriers.

18. The method of claim 1 wherein the first and second signals are Orthogonal Frequency Division Multiplexed signals, the first signal is modulated onto a first plurality of subcarriers, the first plurality having a first bandwidth, the second signal is modulated onto a second plurality of subcarriers, the second plurality having a second bandwidth, and:
setting the frequency response of signal processing elements in the second receiver branch comprises setting the frequency response equal to the frequency response of signal processing elements in the first receiver branch; and estimating IQ imbalance and compensating the estimated IQ imbalance on a per-subcarrier basis.

19. The method of claim 18 wherein estimating IQ imbalance on a per-subcarrier basis comprises injecting a test signal into at least one receiver branch on each subcarrier.

20. The method of claim 18 further comprising, for each subcarrier without a pilot signal, using decision-directed IQ estimation.

21. A receiver operative to receive at least first and second communication signals, wherein the first signal is modulated onto a first carrier having a first bandwidth, and the second signal is modulated onto a second carrier having a second bandwidth, the receiver operative to process In-phase (I) and Quadrature (Q) components of the received signals, comprising:
- a first receiver branch comprising signal processing elements having a first frequency response and operative to receive and process the first signal; and
- a second receiver branch comprising signal processing elements having a second frequency response and operative to receive and process the second signal;
- wherein the frequency response of signal processing elements in the second receiver branch is sufficient to not fully attenuate received signals within a frequency band of interest, the width of which is greater than the carrier bandwidth of the second signal, so as to include information from at least part of the first signal, outside of the carrier bandwidth of the second signal, in an image of the first signal appearing in the second receiver branch due to IQ imbalance.

22. The receiver of claim 21 wherein a frequency response sufficient to not fully attenuate received signals within a frequency band of interest comprises a frequency response sufficient to not attenuate received signals within the frequency band of interest.

23. The receiver of claim 21 wherein a frequency response sufficient to not fully attenuate received signals within a frequency band of interest comprises a frequency response sufficient to partially attenuate interfering signals within the frequency band of interest.

24. The receiver of claim 23 wherein the degree of attenuation of interfering signals within the frequency band of interest is determined by the quantization error in the second receiver branch introduced by the interfering signals.

25. The receiver of claim 23 wherein the first and second signal carrier bandwidths are equal, and wherein the frequency response of signal processing elements in the second receiver branch is equal to the frequency response of signal processing elements in the first receiver branch.

26. The receiver of claim 21 further comprising:
- an interference power estimator operative to estimate the power level of interference in the first and second signals; and
- an adaptive frequency response function operative to adaptively the frequency response of signal processing elements in the second receiver branch to not fully attenuate interfering signals within the frequency band of interest if the interference power level is sufficient to increase IQ imbalance above a predetermined IQ imbalance threshold but insufficient to increase quantization error in the second receiver branch above a predetermined quantization error threshold, and operative to set the frequency response equal to the second bandwidth otherwise.

27. The receiver of claim 21 wherein the frequency response of signal processing elements in the second receiver branch equals the frequency response of signal processing elements in the first receiver branch, and further comprising:
- a calibration unit operative to calibrate the first and second receiver branches to have the same frequency response to within a predetermined frequency response error threshold.

28. The receiver of claim 27 wherein the calibration unit is operative to perform the frequency response calibration when the receiver is initially powered to an operative state.

29. The receiver of claim 27 wherein the calibration unit is operative to perform the frequency response calibration at predetermined intervals.

30. The receiver of claim 27 wherein the calibration unit is operative to perform the frequency response calibration by injecting a test signal into at least one receiver branch and measuring its attenuation at the output of signal processing in the branch.

31. The receiver of claim 30 wherein the test signal comprises a single-tone signal.

32. The receiver of claim 30 further comprising repeating the calibration test while altering the frequency of the single-tone test signal over the first bandwidth.

33. The receiver of claim 21 wherein the first and second signals are Orthogonal Frequency Division Multiplexed, the first signal is modulated onto a first plurality of subcarriers, the first plurality having a first bandwidth, the second signal is modulated onto a second plurality of subcarriers, the second plurality having a second bandwidth, and the frequency response of signal processing elements in the second receiver branch equals the frequency response of signal processing elements in the first receiver branch, and further comprising:
- a IQ imbalance estimation and compensation function operative to estimate IQ imbalance and compensate the estimated IQ imbalance on a per-subcarrier basis.

34. The receiver of claim 33 wherein the IQ imbalance estimation and compensation function is operative to estimate IQ imbalance on a per-subcarrier basis by injecting a test signal into at least one receiver branch on each subcarrier.

35. The receiver of claim 34 wherein the IQ imbalance estimation and compensation function is further operative to use decision-directed IQ estimation for each subcarrier without a pilot signal.

* * * * *

UNITED STATES PATENT AND TRADEMARK OFFICE
CERTIFICATE OF CORRECTION

PATENT NO. : 8,798,177 B2
APPLICATION NO. : 13/098954
DATED : August 5, 2014
INVENTOR(S) : Park et al.

It is certified that error appears in the above-identified patent and that said Letters Patent is hereby corrected as shown below:

On the Title Page, in Item (75), under "Inventors", in Column 1, Line 1, delete "Seoul (KR);" and insert -- Santa Clara, CA (US); --, therefor.

On the Title Page, in Item (75), under "Inventors", in Column 1, Line 2, delete "Södra Sandby" and insert -- Lund --, therefor.

On the Title Page, in Item (57), under "ABSTRACT", in Column 2, Line 12, delete "anther" and insert -- another --, therefor.

Signed and Sealed this
Twenty-sixth Day of May, 2015

Michelle K. Lee
*Director of the United States Patent and Trademark Office*